July 7, 1959 C. F. FREY 2,894,125

CASCODE TELEVISION TUNER WITH STAGES HAVING
INTER-RELATED SPACE DISCHARGE CURRENTS
AND COMMON GAIN CONTROL

Filed May 25, 1955 3 Sheets-Sheet 1

INVENTOR
CLEON F. FREY

BY Ostrolenk, Faber, Gerb & Soffen
ATTORNEYS

July 7, 1959 C. F. FREY 2,894,125

CASCODE TELEVISION TUNER WITH STAGES HAVING INTER-RELATED SPACE DISCHARGE CURRENTS AND COMMON GAIN CONTROL

Filed May 25, 1955 3 Sheets-Sheet 2

INVENTOR.
CLEON F. FREY

BY Ostrolenk, Faber, Gerb & Soffen

ATTORNEYS

INVENTOR.
CLEON F. FREY

BY Ostrolenk, Faber, Gerb & Soffen
ATTORNEYS

United States Patent Office 2,894,125

Patented July 7, 1959

2,894,125

CASCODE TELEVISION TUNER WITH STAGES HAVING INTER-RELATED SPACE DISCHARGE CURRENTS AND COMMON GAIN CONTROL

Cleon F. Frey, Pasadena, Calif., assignor to Standard Coil Products Co. Inc., Los Angeles, Calif., a corporation of Illinois Application May 25, 1955, Serial No. 510,934

3 Claims. (Cl. 250—20)

This invention relates to improvements in automatic gain control systems, particularly for electronic signalling and communication circuitry.

The field of the present invention embraces electronic circuits, such as radio frequency (also referred to as R.F.) amplifiers used in television receivers for either black and white or color, for amplitude and frequency modulation, sound amplifiers, ultra high frequency (hereinafter referred to as UHF) and very high frequency (hereinafter referred to as VHF) receivers in general, radar, and communication devices. Basically the invention relates to improvements extending the range of automatic gain control effective in such systems, and the elimination of disadvantages and limitations of prior gain control systems used in such field.

In the automatic gain control (also referred to as AGC) systems of the prior art, a unidirectional or direct current signal is created of value proportional to the signal received either corresponding to its carrier strength or the strength of the modulations thereon. Such unidirectional signal is fed back or otherwise applied to the control grid of one or more stages at the radio frequency or front end of the system. An increasing signal strength produces a more negative unidirectional magnitude or bias for these control grids; and conversely, a lower signal, a smaller automatic control bias value. The circuits are designed within a practical range of operation for the automatic gain control as is understood in the art to date.

The automatic gain control systems embodying the grid biasing feature aforesaid have a general limitation in the degree of gain reduction in a particular circuit. Thus, in an R.F. amplifier in a television receiver, whether a neutralized triode, a pentode, or a cascode stage, a gain reduction generally of the order of 500 and often only up to 1000 is the practical limit in view of the cut-off characteristics of the R.F. tubes. Such gain reduction is insufficient to prevent overload at the mixer stage for modern strong broadcast signal areas. A similar defect in the AGC system occurs in other applications aforesaid, as in FM, radio, audio, and for communications in general.

It is apparent that one cannot apply unlimited AGC control in the early stages of a communication receiver such as at the R.F. stage thereof. For example, if a signal of 1000 microvolts is applied to the input R.F. tube of the receiver, one would obtain too rapid an increase in noise operation at reduced signal levels. In other words, by attempting to adjust the AGC control to take care of very strong signals, the amplifier would be "all out" and introduce severe noise signals at the R.F. stage when operating on low-level or weak signal reception. Such noise consideration is a limiting factor in the overall gain reduction that may be designed into the prior art AGC systems.

It was to prevent too rapid a deterioration of the noise figure with bias in cascode amplifiers that led to the introduction of delayed AGC at the initial stage thereof. With delayed AGC the noise figure does not deteriorate as rapidly as it ordinarily does with nondelayed AGC action. It is desirable, however, to apply AGC control in the circuit as fast as possible in correspondence to a received strong signal. As is realized in the prior art, this is impractical when the factors of noise and overload are considered, and delayed AGC is applied.

In television receivers, it is particularly disconcerting to have noise as it mingles with the signals and appears as snow in the picture quality received. In color television, such noise would deteriorate the color quality considerably and be more unpleasant than even its impact on black and white pictures.

The present invention is directed to novel circuits for stabilizing and minimizing such effects with the further advantages of a larger overall gain reduction ratio and peak signal reception than is practical with prior AGC systems.

A further important disadvantage in prior AGC systems, particularly for television, concerns the factor known as "tilt with bias." It is found that the application of automatic gain control bias variation to the grid of the R.F. input stage, namely at the tuner of a television receiver, rapidly deteriorates or de-tunes the input tuned circuit thereof. Since the relative magnitude of the picture and sound carrier signals in television reception is significant, the shape of the amplification curve therebetween is important for uniform reception.

Such tilting with bias of the reception curve due to a de-tuning action by the AGC affords non-uniform signal reception. The present invention is particularly directed to overcome such tilting with bias over a considerably greater range of AGC action than heretofore possible with prior systems. Such avoidance of tilting with AGC control bias action on the tuner or front end of a television receiver is essential and significant in maintaining quality of reception of color television.

A further important characteristic in receivers of relative high frequency is the factor of standing wave ratio of the voltage applied to the amplifier, namely the voltage standing wave ratio (hereinafter referred to as VSWR). The factor of VSWR results from overloading or mismatching in the circuit. The VSWR factor, as is understood by those skilled in the art, is of considerable advantage and importance in tuners for color television receivers. The present invention maintains a practical VSWR ratio and overwide operating levels of signal strengths.

In accordance with the present invention the overall automatic gain control or AGC action is afforded with the AGC bias voltage applied to the control grid of an initial R.F. stage, as well as to further control the effective anode current level on subsequent amplifier stages.

With a given control grid bias, change of the internal or anode tube current changes its plate current-grid voltage characteristic curve, and hence its effective impedance to the anode voltage. The invention system thus effectively changes the tube voltage. By reducing the anode voltage on an amplifier tube (and on its screen grid as well, as where used), the amplification of and internal unidirectional current of such tube reduces. Conversely, increase of the anode voltage to the anode (and screen grid) on an amplifier tube increases its amplification and internal current.

The amplifier stage or stages of the invention system are controlled by the action of the AGC voltage on one of the amplifier stages. In other words, the overall AGC action of the invention system is the cumulative or cascoded effect of the AGC actions on the control grid of one stage, and the further corresponding control action of the amplification on one or more stages through the anode currents thereof.

In one form of the invention system, the initial stage is connected to the AGC bias voltage through its control grid in the usual manner, and the plate current return of a subsequent stage or stages is connected to pass through the anode circuit of the initial first stage. The anode currents (and where employed, the screen grid currents) through the subsequent stages pass through the initial tube and their magnitude is controlled thereby.

A composite overall automatic gain control is accordingly effected by the invention system in a stable manner, with the elimination of many of the prior art limitations.

The invention system provides a far greater range or ratio of gain than the prior grid control AGC actions alone, and affords the handling of signals of much greater input strengths without introducing noise for weak input signals. As will be set forth hereinafter in connection with the description of exemplary embodiments of the present invention, tilt with bias on the tuned input circuit is avoided in all practical applications, and the VSWR ratio remains near unity without causing deleterious effects on amplified signals. The invention system is applicable to all types of amplifier circuitry, such as to pentodes, tetrodes, triodes and cascode stages. The invention, further, is applicable not only to the black and white and color television receivers, but also to radio, frequency modulation, and other types of communication systems.

It is accordingly an object of the present invention to provide novel automatic gain control systems for electronic receivers and amplifiers.

A further object of the present invention is to provide a novel automatic gain control system that does not deteriorate the tuned circuit of an initial amplifier stage over a wide gain reduction range.

Another object of the present invention is to provide a novel automatic gain control system which actuates the anode current through amplifier stages thereof.

Still another object of the present invention is to provide novel automatic gain control by employing AGC bias to an initial amplifier stage at its control grid, and in turn control the anode supply of a subsequent amplifier tube or tubes.

Still another object of the present invention is to provide a novel automatic gain control system particularly applicable to color television tuners.

A further object of the present invention is to provide a novel automatic gain control system significantly extending to the AGC gain reduction ratio and range of signal strength reception by an R.F. receiver.

Still a further object of the present invention is to provide a rapid and effective automatic gain control action over a wide range without requiring delayed AGC circuitry.

Still another object of the present invention is to provide a novel automatic gain control system wherein the noise factor with respect to gain reduction range is considerably improved, over a wide ratio of signal strength reception.

Still another object of the present invention is to effect a novel automatic gain control system effective on a plurality of stages of an amplifier system, and over an extended range of operation at a minimum cost in components and circuitry.

These and further objects of the present invention will become apparent from the following description of exemplary embodiments thereof, taken in connection with the drawings in which Figure 1 is a diagram of an exemplary embodiment of the invention as applied to a television tuner.

Figure 1:
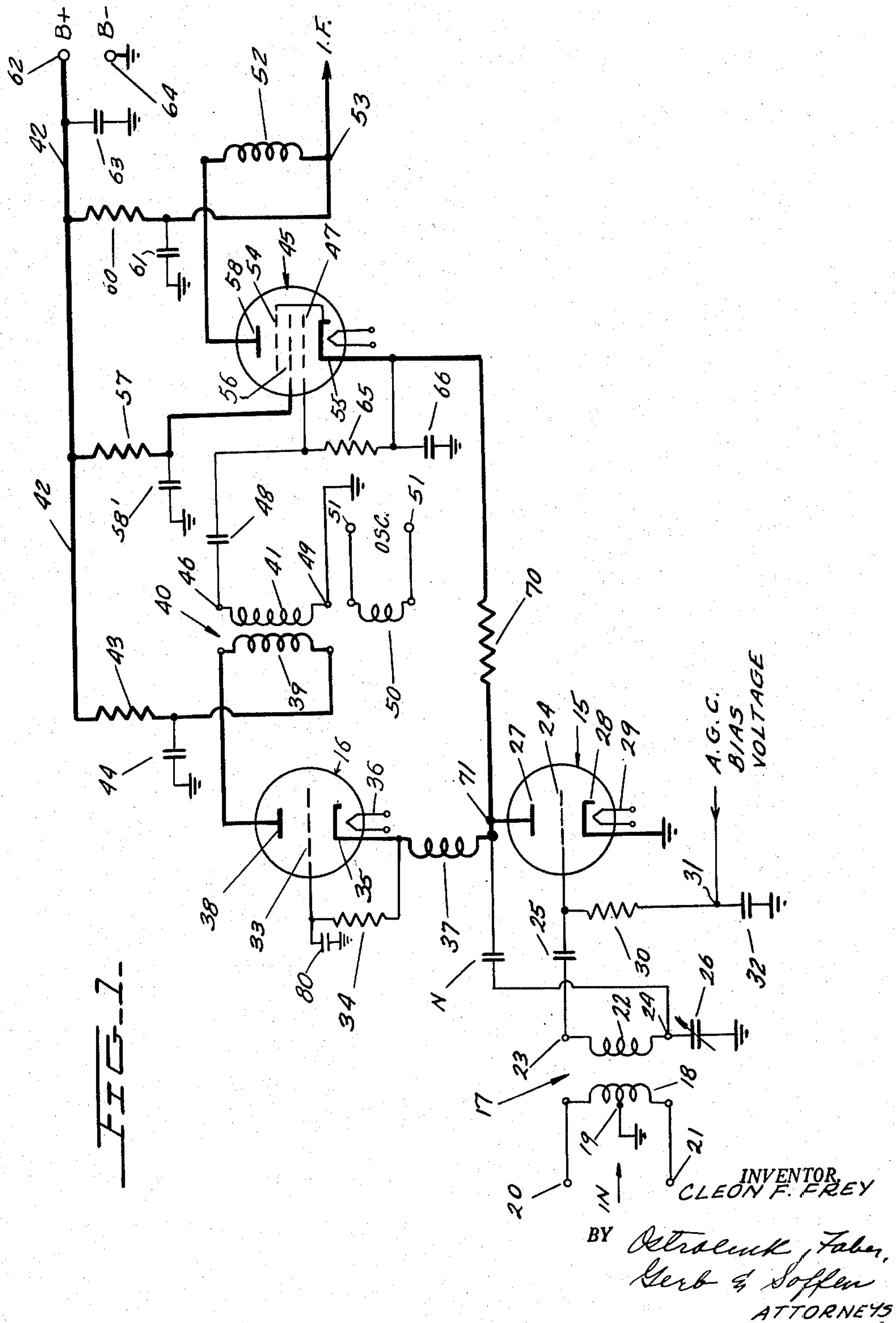

The television tuner illustrated in Figure 1 embodies a cascode R.F. input circuit and a pentode mixer-amplifier section, generally in the manner of modern high quality television tuner circuitry. The cascode amplifier of the tuner comprises a grounded cathode triode 15 and a companion triode 16. The tuner is arranged for VHF reception, namely of the frequency spectrum from 54 megacycles to 216 megacycles.

Particular amplifier details of the circuit in connection with the cascode R.F. section 15, 16 are not significant to the invention system. A neutralized triode or a pentode amplifier stage may instead be used. Reference is made for the factors involved in generalized R.F. amplification by cascode means to co-pending application Serial No. 211,959, filed on February 20, 1951, now Patent No. 2,775,659, granted December 25, 1956, and assigned to the same assignee as the present case.

The input circuit to the tuner embodies a conventional antenna transformer 17, the primary winding 18 of which has its center tap 19 grounded. The input terminals 20, 21 of transformer 17 are connected to the receiving antenna (not shown) such as at 300 ohms impedance. The secondary winding 22 of antenna transformer 17 has its terminal 23 connected to grid electrode 24 of triode 15 through coupling condenser 25.

A tunable variable condenser 26 connects terminal 24 of secondary 22 to ground. A neutralizing condenser N connects terminal 24 to anode 27 of triode 15. Cathode 28 is connected to ground potential as in the usual cascode amplifier circuit. Heater 29 for cathode 28 is connected to the heater supply voltage.

The automatic gain control or AGC bias voltage is applied to the control grid 24 of triode 15 through grid coupling resistor 30 at its terminal 31. Terminal 31 has a smoothing condenser 32 connected thereto. Triode 16 associated with triode 15 constitutes the cascode amplifier for the tuner of Figure 1. Control grid 33 of tube 16 is self-biased through biasing resistor 34 connected between grid 33 and cathode 35. By-pass condenser 80 is connected between control grid 33 and ground.

In the circuit of the present invention, it has been found desirable to effect the self-biasing action through resistor 34 for grid 33. Heater 36 serves cathode 35. Inductance 37 of relatively few turns and low inductance interconnects anode 27 and cathode 35 in cascode circuit relationship for the reasons as set forth in the co-pending application referred to. Inductance 37 is referred to as a peaking coil. It is designed to afford uniform amplification of a wide signal band such as in television reception, covering all channels such as of the VHF band. Reference is made to the aforesaid co-pending application for further details of a cascode circuit.

The output of triode 16 is connected through anode 38 thereof. Output transformer 40 having a primary winding 39 connects to anode 38, and secondary winding 41 to the subsequent amplifier stage (45). Primary winding 39 is connected between anode 38 and B+ supply line 42 through dropping resistor 43.

By-pass condenser 44 is connected between resistor 43 and ground. It is to be understood that while transformers 17 and 40 are shown with unitary coils, in practice successive changes are made in their overall inductance values to afford efficient tuning and amplification of the respective channels for television. Such inductance changes are effected by rotary switch means, or by turret tuning arrangements as is well known in the art. Such diagrammatic representations of the transformers 17 and 40, and the associated circuitry thereof, are for the purpose of simplification of presentation. The invention embodies tuning devices as are used and applicable in all its practical counterparts, as for television tuners for coverage of multiple bands; for radio, radar or other signalling systems. In the case of television signals, the band width of each channel is 6 megacycles, and accordingly, multiple inductance sections are used in coupling transformers in a tuner for uniform and overall amplification thereof.

The amplified signals across R.F. transformer 40 are applied to the control grid of the pentode stage 45. Secondary winding 41 has one of its terminals 46 connected to the control grid 47, through coupling condenser 48; and its terminal 49, to ground. A further signal is applied to control grid 47 of pentode 45, namely from an associated oscillator circuit (not shown) to the oscillator winding 50 through terminals 51, 51 marked "OSC." Oscillator coil 50 is coupled with secondary winding 41 in order that the local oscillator signals are impressed upon control grid 47 of pentode mixer 45 in conjunction with received television signals. The usual heterodyning of the signals occurs in mixer pentode 45 and produce corresponding signals at the intermediate frequency (hereinafter referred to as I.F.) from anode 58 across output coil 52. The I.F. signals are conducted to the I.F. amplifier stages of the television receiver, from point 53 of output coil 52. The suppressor grid 54 of pentode 45 is connected to the cathode 55.

The screen grid 56 of tube 54 is connected to the B+ supply through dropping resistor 57 at supply lead 42. A by-pass condenser 58 connects resistor 57 to ground. The B+ supply to anode 58 of stage 45 is connected in series with output coil 52 through dropping resistor 60 at line 42. A by-pass condenser 61 connects resistor 60 to ground. The B+ supply connects to terminal 62, at which supply lead 42 terminates. A by-pass condenser 63 further stabilized D.C. supply line 42. The negative or B− supply at terminal 64 is connected to the ground return of the amplifier. A self-biasing resistance 65 connects between control grid 47 and cathode 55 to establish a suitable operating bias for grid 47. A capacitor 66 is connected between the terminal end of resistor 65 and ground. It is to be noted that cathode 55 is not connected to ground in this invention system.

An important feature of the present invention will be noted by following the path of the internal unidirectional or direct current through mixer stage 45. As is understood by those skilled in the art, the plate unidirectional current normally flows through the tube between anode 58 and cathode 55. In the conventional system, such plate current is returned to the B+ source through ground return. The cathode 55 of the invention system however is isolated from ground by capacitor 66. However, cathode 55 of stage 45 is connected directly to anode 27 of triode 15 through a resistor 70.

Thus, the only way in which the plate current from anode 58 to cathode 55 of the tube 45 can return to the B+ supply, and establish the normal operating current through the tube 45, is through resistor 70 and also through anode 27-to-cathode 28 path of triode 15 to ground. The anode current from tube 45 thus flows through resistor 70 and through triode 15, through cathode 28 to the ground return to B− at terminal 64.

A similar function and action occurs to the screen grid current flowing between screen grid 56 and cathode 55. The screen grid current cumulates with the anode current through tube 45, and together flows through resistor 70 and triode 15 in the circuit herein, to ground return. In the further presentation of the invention herein, the screen grid current of pentode 45 and the anode current thereof will be often treated together as the unidirectional current tube 45. Their separation for the purposes of discussion of the present invention is not significant. Thus, if a triode were used as the mixer stage in place of pentode 45, its anode current would flow through its cathode, on to resistor 70, with similar results, as will be set forth.

It will also be noted that the current flowing between anode 38 of triode 16 and cathode 35 thereof, likewise does not encounter ground return, but flows directly to anode 27 of triode 15 through the coupling inductance 37. The plate voltage supplies of the successive stages 16 and 45 of the tuner amplifier of Fig. 1 thus are coupled for ground return only through the amplifier stage 15. In all other respects, the function and operation, electrically and electronically, of the stages 16 and 45 are conventional, and are performed in the normal manner. However, with respect to overall gain control, their internal plate (and screen grid currents) are under the control of the triode 15 for overall AGC action, as will now be set forth.

It is significant to note that the plate current between anode 27 and cathode 28 of triode 15 is the algebraic sum of the plate current of triode 16 and the plate and screen grid currents of pentode 45. The reason for this is that the unidirectional currents flowing through tubes 16 and 45, necessarily must execute their ground return after flowing through tube 15.

The anode supply voltage for tube 15 occurs at its terminal point 71, which potential is determined by the overall voltage drops in the system in the manner set forth in connection with the description of diagrammatic Figs. 2 and 3.

Automatic gain control is effected on the control grid 24 of initial stage 15 in the conventional manner, by applying the AGC bias voltage to terminal 31 of grid resistor 30. The bias of control grid 24 of triode 15 is accordingly controlled by the magnitude of the AGC bias voltage applied to resistor 30. The AGC bias voltage is generally of negative value, with increasing negative magnitude causing a corresponding decrease in the amplification of triode 15. The usual plate current-to-grid voltage characteristic curves for amplifier tubes apply, and causing the AGC voltage applied to grid control 24 to be more or less negative, correspondingly causes the plate current between anode 27 and cathode 28 of tube 15 to vary inversely. Namely, a less negative bias on grid 24 results in a greater plate current, and more negative bias, in a smaller plate current, as is understood by those skilled in the art.

The prior art AGC control action in effect, stopped at this point, wherein the amplification or level of control by the AGC bias voltage through control grid 24, directly affects a corresponding change in the slope of the characteristic curve for the tube, as represented by the plate-current-to-grid voltage curve. A more negative control voltage results in a smaller amplification of signal through the R.F. stage to which the AGC bias is applied; and a less negative AGC voltage, in a higher gain for the applied signals.

An important feature of the present invention is to also take advantage of the varying plate current due to the AGC bias changes on R.F. amplifier 15.

The currents through amplifier stages 16 and 45 hereof necessarily flow through stage 15. The total of the currents through 16 and 45 equals the full current through stage 15. Variation of the total unidirectional current flow through stage 15 necessarily and correspondingly changes the total current flow through each stage 16 and 45. Current changes in respective stages 15, 16 and 45 correspondingly change the voltage drops and the voltage distribtuions across the respective tubes, as is described in connection with Figs. 2 and 3. A diminished current flow through tube 15 accordingly results in decreased amplification by stages 16 and 45. It thus supplements the AGC gain decrease effected through tube 15 by an increasing negative AGC bias voltage applied to its control grid 24.

Correspondingly, when the AGC bias voltage is decreased in its negative value, more unidirectional current flows between anode 27 and cathode 28 of amplifier 15, thereby increasing the allocation of currents permitted to flow through stages 16 and 45. The gain namely their characteristic curve slope performance or amplification curves is enhanced. The overall gain by successive stages 16 and 45 supplements the gain through tube 15, as a result of the AGC condition stated. It will now be apparent that the AGC action upon the system of the tuner of Fig. 1 is the composite of the grid control through bias on the initial stage at 15, and the corresponding current (and voltage) control through the successive stages 16 and 45, to effect their amplification in the like direction of the action of tube 15.

Figures 2, 3, 4, 5, 6:
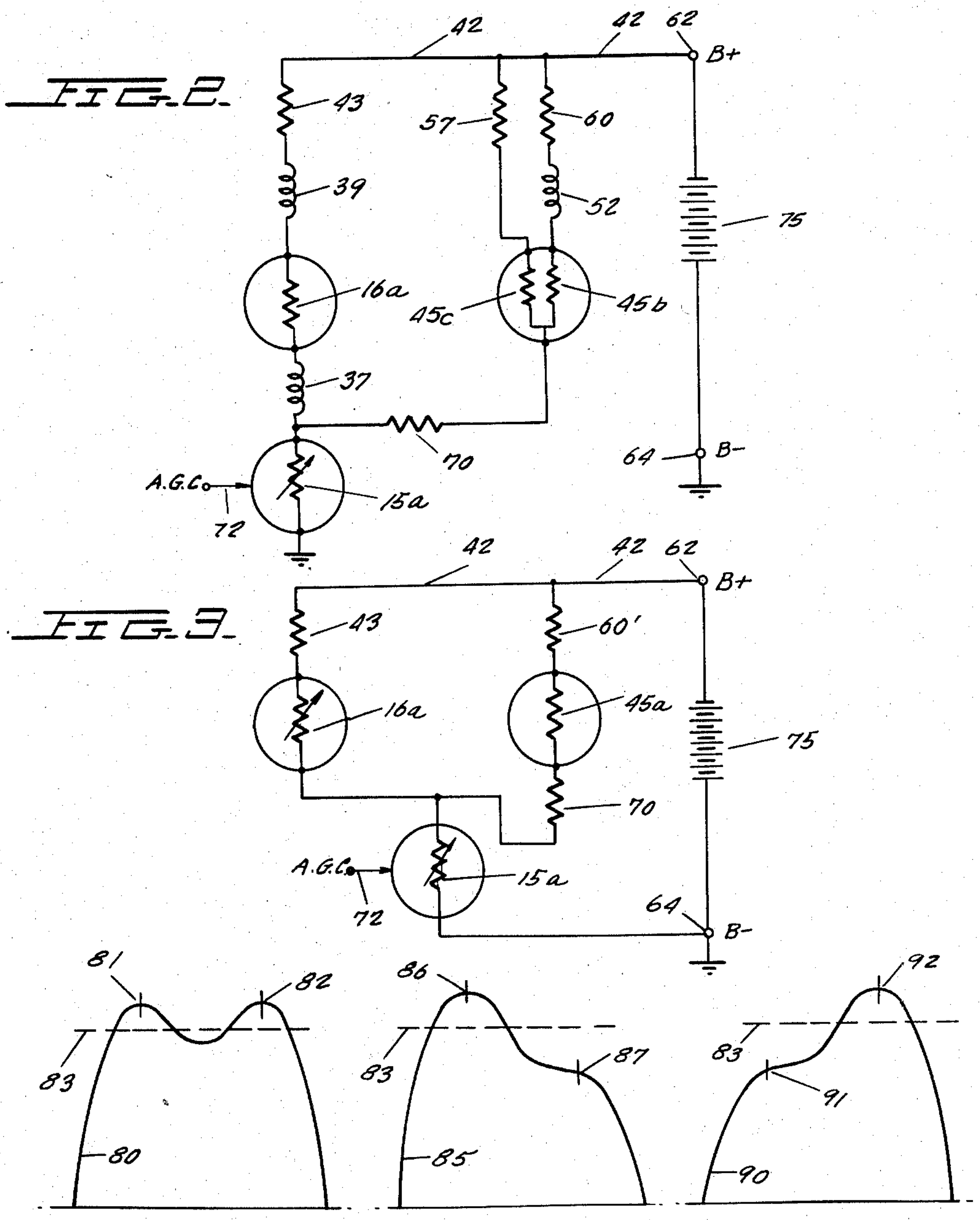
Figure 2 is a diagrammatic illustration showing the anode voltage distribution through the system of Figure 1.
Figure 3 is a simplified representation of Figure 2.
Figures 4, 5 and 6 illustrate characteristics of a television tuner amplification curve.

For a further understanding of the basic AGC control action afforded by the present invention, a diagrammatic representation of the circuit of Fig. 1 is illustrated in Fig. 2. Here the direct current passages and coactions of the anode supply of the respective stages are represented. The elements determining the direct current flow, and the inter-relations of the effective components of the circuit, are incorporated in this diagram; with the electronic components constituting the R.F. and other factors of the system not included.

The vacuum tube stages 15, 16 and 45 are represented in the diagram by corresponding effective resistances $15^a$, $16^a$ and $45^b$, $45^c$. The mixer tube 45 has its screen grid current represented by resistor $45^c$. The basic anode current through tube 45 is represented by resistance path $45^b$. Both resistors $45^b$ and $45^c$ join in a common potential at series resistor 70, into effective resistance path $15^a$. The AGC action on the tube 15 is represented diagrammatically by the arrow 72 upon variable resistance path $15^a$. $15^a$ is, in effect, a resistance path of magnitude varied by the action of the AGC at 72, and is shown as a variable resistance in the circuit of Fig. 2.

While it is also true that the resistance $16^a$ and $45^b$ effectively vary with change in current therethrough, they are shown as steady resistances for the purposes of exposition. Furthermore, it is to be understood that while a preferred theory for the highly successful operation which has been achieved with the present invention is set forth herein, other theories equally effective may apply, and that the invention and its operation as described herein are independent of theory expositions for their effectiveness in achieving the desired results.

Dropping resistors 43, 57 and 60 together with impedances 37, 39 and 52 are as used in the system of Fig. 1. The direct current source is represented by battery 75, connected between the B+ and B− terminals 62, and 64. The circuit to battery 75 is completed across ground from the terminus of resistor $15^a$ to B− terminal 64. The current flowing through resistance $15^a$, corresponding to triode 15, is the algebraic sum of the currents flowing through the path from supply line 42; through resistor 43, coil 39, resistance path $16^a$, and coil 37, on the one hand, and the composite paths through resistance 70 determined by the plate path $45^b$, coil 52, resistor 60 and screen grid path $45^c$ and resistor 57. The currents flowing through resistor $15^a$ are completed to the battery 75 through ground return to B−.

A variation of the resistance $15^a$ (due to the AGC action at 72) causes a necessary change in the current distribution through the other paths at $16^a$ and $45^b$, $45^c$. The potential from supply line 42 to ground is maintained substantially constant by the battery 75. The change of resistance at $15^a$ necessarily changes the overall current flow through the system, with the potential of the voltages resulting at the positions $15^a$, $16^a$ and $45^b$, $45^c$ correspondingly changing in a complex mathematical relationship. Significantly, though, it is clearly apparent that the total of the currents flowing into path $15^a$ must always be equal to the current passed through $15^a$. A simplified version of the circuit of Fig. 2 is effectively illustrated in Fig. 3.

The circuit of Fig. 3 shows the variable controlled resistance path $15^a$, corresponding to the direct current path through triode 15, upon which AGC action at 72 controls. The resistance path $16^a$, corresponding to triode 16 constitutes, with its dropping resistor 43, one path to the potential supply 42. The resistance path $45^a$ constitutes the total unidirectional or direct current through pentode 45, in series with resistors 60 and 70, to supply line 42. A change of the unidirectional current flowing through path $15^a$ in effect varies the virtual resistance of $15^a$, and correspondingly changes the voltage distribution across resistance paths $16^a$ and $45^a$, as well as the current distribution through these latter legs of the circuit. It is understood that the current changes effected through the tube paths $16^a$ and $45^a$, are due to the current change through path $15^a$, as a result of the AGC application on tube $15^a$.

The overall amplification of the R.F. signals by tube 15 is the result of the degree of current flowing through tube 15 and the action of the applied signals on the plate current-to-grid voltage (Ip-Eg) slope characteristic of the tube. A similar factor of amplification occurs for tubes 16 and 45, as is understood by those skilled in the art. A smaller current flowing through the tubes results in a smaller amplification due to the Ip-Eg characteristic curves of the tubes. A more negative bias on tube 15 causes a smaller current to flow through the tube 15, and may be represented by a higher resistance value for the tube, at $15^a$. Correspondingly, the smaller currents through tube paths $16^a$ and $45^a$ result in Ip-Eg characteristics for the tubes, affording a lower amplification of the R.F. signals.

Conversely, a smaller AGC negative bias on tube 15 results in a higher current voltage flow through the tube 15, and may be represented by a smaller resistance at $15^a$. The currents of paths $16^a$ and $45^a$ are correspondingly increased, and the operation affords amplification of the R.F. signals (and conversion) at the respective stages 16 and 45 at a higher amplification level. In effect, the initial AGC control tube 15 of the system herein, corresponding to Figs. 1, 2 and 3, is a remote control tube in its gain action on successive stages 16 and 45, through which the tube unidirectional currents flow. The subsequent stages 16 and 45 accordingly have their gain controlled by the initial tube 15, and a composite or cascaded overall gain control is effectuated.

It will thus be apparent, that for a given gain reduction ratio, the overall gain reduction can now be assigned both to a normal AGC grid control gain action at input stage 15, as well as to the compounded subsequent gain reduction effected at stages 16 and 45 through anode supply control in accordance with the invention. It will furthermore now be apparent that a far greater overall gain control ratio or gain reduction range is feasible with the invention system, due to the successive actions by the stages herein, and with a far lower gain reduction ratio needed at the initial stage 15. In other words, where a prior art maximum gain reduction of 1000 was considered as high as is practical with the other factors involved, an overall gain reduction of, say 5000 (or more) is feasible, as will now be noted. In other words, a gain reduction ratio overall of 5000 can readily be effected by designing a gain reduction due to the AGC action on control grid 24 of stage 15 of only 100, and a cascaded reduction by stages 16 and 45 of only 50 to result in the 5000 gain reduction ratio. Thus a far greater gain reduction ratio is feasible with an initial gain reduction at R.F. stage 15 only one-tenth the value as in the prior art maximum. Of course, the ratio figures referred to herein are merely for illustrative purposes, and are dependent upon the parameters and design factors desired or required in any given circuit.

A very important advantage accruing from the invention system is the fact that the tuned circuit loading on the input grid 24 of the initial amplifier stage (15) will not deteriorate as rapidly as in prior art arrangements that do not encompass the function of tube (15) as a remote control tube on the anode currents of subsequent stages (16, 45). Since the loading on the input tube to the initial R.F. amplifier (15) of the circuit of Fig. 1 does not deteriorate within the practical limits of its functioning, the avoidance of tilting with bias change on its amplification curve is eliminated for all practical purposes. This feature is essential in the reception of color television for clear practical reproduction of the color picture elements.

Reference is now made to Figs. 4, 5 and 6 illustrating tilting of tuned amplification curves due to bias change and tuned circuit deterioration. Fig. 4 illustrates curve 80 having the tuned resonance peaks 81 and 82 at substantially the same amplitude level, with a desired norm shown by the dotted line 83. Curve 80 is substantially symmetrical and the resonant peaks 81, 82 correspond to the carrier frequency positions of the sound and picture carriers, and constitutes uniform amplification over the 6 megacycle band-width for the channels of the tuner. By designing the tuned circuitry to the input of grid-to-cathode 25-to-28 of tube 15, to afford the desired curve 80, the prior art AGC systems would distort such curve with the application of more or less AGC bias voltage than the bias center about which curve 80 was designed for the tube 15.

By changing the bias voltage on grid 24, which for example may be 3 volts at curve 80, to say 0 volt, the tuned circuit at 22 would become de-tuned and cause a tilt of the overall band-pass amplification curve for the 6 megacycle signals with respect to desirable curve 80. Curve 85 illustrated in Fig. 5 distorted due to such AGC bias reduction, the picture and sound carriers corresponding to peaks 86, 87 being displaced with respect to normal amplification level 83. A corresponding increase in the negative bias of the AGC, results in reverse distortion of the band-pass curve, as shown at 90 in Fig. 6. The picture and sound carriers 91, 92 herein are also displaced with respect to the desired level 83. Such distortion in curves 85 and 90 for band-passing the signals is undesirable, as it distorts the uniform signal distribution corresponding to the picture information, through the receiver. Such distortion is particularly noticeable in color television, with accompanying degradation of color values.

In accordance with the present invention, such tilting of the band-pass characteristics, corresponding to illustrations 5 and 6, is avoided across the input tuned circuit that controls such band-pass characteristic at grid 24. Tube 15 does not change its impedance or loading at the grid 24, namely does not de-tune or deteriorate with changing bias on grid 24. The invention system affords substantially constant relative loading of the tuned circuitry at transformer 17 and secondary 22 on the input grid 24 of tube 15, and is not detuned or disturbed by reflected impedances through plate 27 from stages 16 or 45. Also, the VSWR is maintained close to unity for a longer period, and for a higher AGC bias range, and over greater gain reduction ratios, in the present system. The decibel gain reduction afforded by the present system, versus the applied AGC control bias, has been found to be far greater than thought possible with prior systems.

The noise in a system is generally determined by the noise figure of the first R.F. tube in an amplifier chain. This corresponds to stage 15 of the system of Fig. 1. In view of the fact that the overall AGC action of the system of Fig. 1 is the composite of that afforded by the first stage 15 together with the succeeding stages 16 and 45, a smaller AGC control range is necessary at stage 15 for a given overall gain reduction ratio. Thus, the overall AGC noise producing factor by tube 15 is greatly reduced, and it is not necessary to "open up wide" the bias on the tube 15 for the weak signals, as the design center is such to accommodate the weakest and strongest signals with minimum noise figures.

Accordingly, the overall noise factor or noise deterioration in the invention system as a whole, is far less than in AGC systems of the prior art. This, again, is an important feature for color television, where noise impulses deteriorate color values of the picture, and are far more apparent to the eye than even noisy black-and-white reception. A further advantage in the factor of minimum noise deterioration of the invention system is that it is unnecessary to employ delayed AGC circuitry, as the present system is fast-acting, and the range of AGC bias necessary for this purpose (on stage 15) is less for any given overall gain reduction ratio. The system of AGC gain control of the present invention is of a minimum cost, and employs less components and circuitry than comparable gain reduction systems in the prior art. One AGC string in the present case controls all the signals for the I.F. stages, directly from the tuner section itself, namely the circuitry of Fig. 1.

Figure 7:
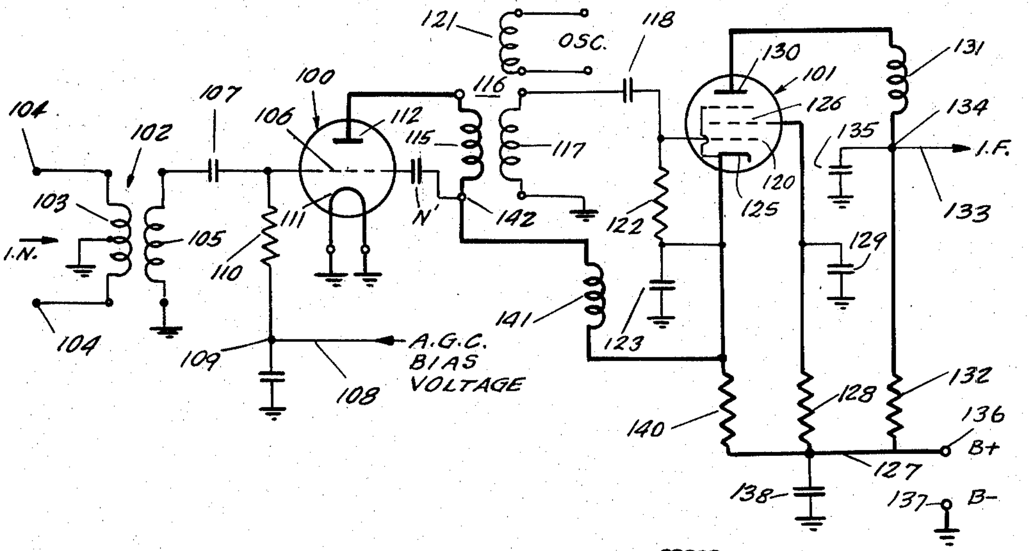
Figure 7 is a schematic electrical diagram of a further exemplary embodiment of the invention as applied to a television tuner.

A modification of the invention system is illustrated in a further exemplary embodiment thereof, schematically shown in Fig. 7. In the system of Fig. 7, a neutralized triode amplifier is employed for the first R.F. stage, together with a subsequent pentode mixer stage. The principles of the invention herein are effected by employing an initial stage (100) as a conventional grid AGC controlled amplifier in conjunction with its function as a remote control on the anode current through a subsequent amplifier stage (101) In Fig. 7 the R.F. neutralized triode is shown at 100, conjunction with a pentode mixer stage 101. The input circuit to triode stage 100 is similar to Fig. 1, namely, an R.F. or antenna transformer 102, the primary 103 of which is connected to an antenna (not shown) at terminals 104, 104. One end of secondary winding 105 of antenna transformer 102 is connected to the control grid 106 of triode 100, through coupling condenser 107, with the other end of winding 105 connected to ground.

The AGC bias voltage is applied through lead 108 to terminal 109 on grid coupling resistor 110. A filament 111 serves as the effective cathode for triode 100. Both terminals of filament 111 are connected to ground return. The output of triode 100 comprises anode 112 connected to primary 115 of R.F. transformer 116. The secondary 117 of transformer 116 is connected to grid electrode 120 of mixer pentode 101 through coupling condenser 118. An oscillator coupling coil 121 is associated with secondary winding 117 to inject a suitable local oscillator voltage to control grid 120. A self-biasing resistor 122 is connected between control grid 120 and cathode electrode 125 of tube 101. A ground by-pass condenser 123 is connected between cathode 125 and resistor 122 and ground.

Screen grid electrode 126 is suitably connected to anode B+ supply line 127 through dropping resistor 128, which is by-passed to ground by condenser 129. The anode 130 of tube 101 is connected to anode supply line 127 through output coil 131 and dropping resistor 132. A lead 133 from the terminal 134 of output coil 131 connects to the I.F. input of the intermediate frequency amplifier of the television receiver. A by-pass condenser 135 connects terminal 134 to ground. The anode supply line 127 connects to terminal 136 to the B+ supply; the B− terminal 137, being connected to ground return. A by-pass condenser 138 connects the supply line 127 to ground, to stabilize its action.

The anode voltage supply to plate electrode 112 of triode amplifier 100 connects to voltage supply line 127 through dropping resistor 140 and choke coil 141, through the primary winding 115. A neutralizing condenser N′ connects between terminal 142 of winding 115 and control grid 106. The anode current through tube 100 accordingly also includes the anode and screen grid currents from tube 101, passing through the cathode 125, choke 141 and primary winding 115 to the plate 112 of tube 100, in the manner of the system of Fig. 1 hereinabove.

Figure 8:
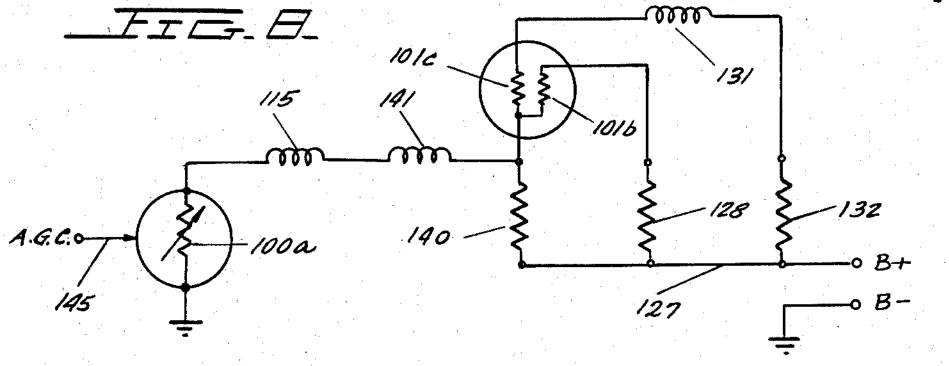
Figure 8 is a diagrammatic illustration of the anode voltage distribution through the system of Figure 7.

Fig. 8 is a diagrammatic representation of the D.C. current paths of the circuit of Fig. 7. The variable resistance path $100^a$ corresponds to the tube path of the unidirectional current from anode 112 of tube 100. The AGC action controls resistance path $100^a$ in a variable manner, through the schematic connection indicated at 145. The resistance path $101^b$ represents the corresponding current from anode 130; and $101^c$, the current from screen grid 126, of tube 101. The remaining coils 115, and 141, 131 are as in Fig. 7; as are the dropping resistors 128, 132 and 140. It will be noted that the currents through $101^b$ and $101^c$, through the effective resistance paths shown, are returned to ground potential through the resistance (and current) path $100^a$, in the manner of the current paths described in connection with Fig. 2.

Figure 9:
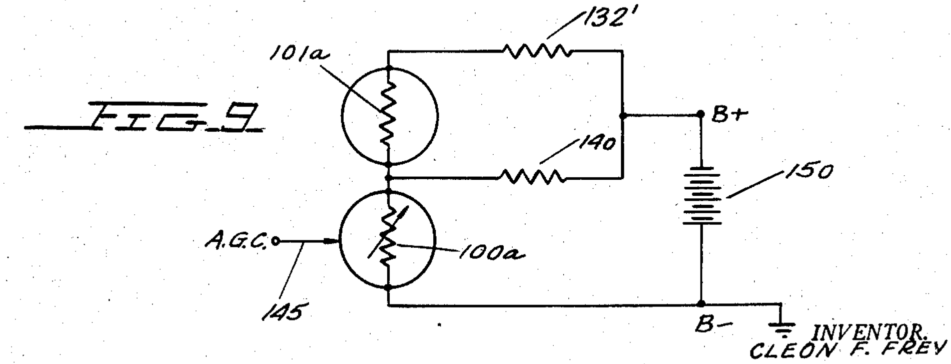
Figure 9 is a simplified representation of Figure 8.

Fig. 9 is a simplified diagram of Fig. 8. The variable resistance path $100^a$ is shown in its circuital relationship with effective resistance path $101^a$, the latter corresponding to the sum of the paths $101^b$ and $101^c$. The fixed potential source, battery 150, supplies the anode voltage to the tube paths represented by resistances $101^a$ and $100^a$, through the respective effective resistance 132′ and the resistance 140. The current through the path $100^a$ includes that through path $101^a$, as will now be understood to those skilled in the art.

The successive amplification in the circuit of Fig. 7, is under the control action of tube 100. The amplification of tube 100 itself is predicted upon its Ip-Eg characteristic curves, as determined by the current flowing through the tube (100), in turn controlled by the AGC bias voltages applied to control grid 106 (and the effective voltage at its anode 112). However, the overall AGC action of the system of Fig. 7 further includes the gain control effectuated by tube 101, by changing of the anode and screen grid currents through it (and the effective voltage on its plate 130). The voltage and current distributions of the system of Fig. 7, corresponding to schematic Fig. 9, vary with the variation of the resistance path $100^a$, as affected by the AGC bias voltage on tube 100 (at 145 and 108).

The successive or cascaded AGC action is effectuated by the grid control action of AGC bias on tube 100, changing its Ip-Eg characteristic shape, as described in connection with Fig. 1; and the corresponding current changes necessitated through tube 101 by the current changes at tube 100. The latter changes of the current in tube 101, move the amplification (and mixing) amplitude action by tube 101 to different Ip-Eg characteristic shapes to which the currents adjust at tube 100, as set forth in connection with the circuit of Fig. 1. All the advantages accruing to the system of Fig. 1 in connection with such AGC action in Fig. 7, follow in the same manner; affording stabilized loading to the coil circuit including 105 and control grid 106 of tube 100, stabilization of the VSWR, and effective noise reduction with greater overall gain reduction ratio.

While the present invention has been set forth in connection with neutralized triode and cacode R.F. amplifier inputs, it is to be understood that pentode, tetrode, or other amplifier stages may instead be employed, that the successive amplifier stages may use different types of tubes; and its application generalized wherever automatic gain control is required in receivers, as will now be understood by those skilled in the art. The principles and features of the present invention may be varied without departing from the spirit and scope thereof, and it is not intended to be limited except as set forth in the following claims.

I claim:

1. In a television tuner, a first grounded cathode triode, a second grounded grid triode, a coupling impedance connecting the anode of the first triode to the cathode of the second triode and providing a D.C. connection therebetween, said coupling having substantially no impedance at the low end of the frequency band of said amplifier and having an inductance value which resonates with the cathode to ground impedance of said second triode at the high end of the frequency band of said amplifier, a tunable circuit connected to the input grid of said first triode, circuit connections to the grid of the first triode applying automatic gain control thereto, a source of oscillations, a mixer pentode, circuit connections coupling said source of oscillations to the control electrodes of said pentode, a coupling impedance connecting the anode of said second triode to the control electrodes of said pentode, a D.C. circuit connection from the anode of said first triode to the cathode of said mixer pentode including an impedance coupling a source of D.C. supply, and D.C. circuit connections extending from said D.C. source to the anode of said pentode mixer and the anode of said second triode, said D.C. source flowing to the anode of said first triode from both the second triode and the mixer pentode through the D.C. connections thereto, whereby an overall automatic gain control is effected while maintaining the tuned characteristics of said tuned circuit effectively uniform over a wide range of gain control.

2. In a television tuner, a first grounded cathode electron tube having an input electrode, a second grounded control grid electron tube, a coupling impedance connecting the anode of the first electron tube to the cathode of the second electron tube and providing a D.C. connection therebetween, said coupling having substantially no impedance at the low end of the frequency band of said amplifier and having an inductance value which resonates with the cathode to ground impedance of said second electron tube at the high end of the frequency band of said amplifier, a tunable circuit connected to the input grid of said first electron tube, circuit connections to the grid of the first triode applying automatic gain control thereto, a source of oscillations, a mixer electron tube having a control electrode, circuit connections coupling said source of oscillations to the control electrode of said mixer electron tube, a coupling impedance connecting the anode of said second electron tube to the control electrode of said mixer electron tube, a D.C. circuit connection from the anode of said first electron tube to the cathode of said mixer electron tube including an impedance coupling a source of D.C. supply, and D.C. circuit connections extending from said D.C. source to the anode of said mixer electron tube and the anode of said second electron tube, said D.C. source flowing to the anode of said first electron tube from both the second electron tube and the mixer electron tube through the D.C. connections thereto, whereby an overall automatic gain control is effected while maintaining the tuned characteristics of said tuned circuit effectively uniform over a wide range of gain control.

3. In a television tuner, a first grounded cathode triode, a second triode, a coupling impedance connecting the anode of the first triode to the cathode of the second triode, a tunable circuit connected to the input grid of said first triode, circuit connections to the grid of the first triode applying automatic gain control thereto, a mixer electron tube, a coupling impedance connecting the anode of said second triode to a control electrode of said mixer electron tube, a D.C. circuit connection from the anode of said first triode to the cathode of said mixer electron tube, a source of D.C. supply, and D.C. circuit connections extending from said source to the anode of said mixer electron tube and the anode of said second triode, said D.C. source flowing to the anode of said first triode from both the second triode and the mixer electron tube through the D.C. connections thereto, whereby an overall automatic gain control is effected while maintaining the tuned characteristics of said tuned circuit effectively uniform over a wide range of gain control.

References Cited in the file of this patent

UNITED STATES PATENTS

| | | |
|---|---|---|
| 2,668,881 | Crosby | Feb. 9, 1954 |
| 2,673,254 | Eland | Mar. 23, 1954 |
| 2,695,975 | Sanford | Nov. 30, 1954 |
| 2,702,857 | Berger et al. | Feb. 22, 1955 |
| 2,712,599 | Carter | July 5, 1955 |
| 2,719,916 | Winfield | Oct. 4, 1955 |
| 2,771,548 | Deutsch | Nov. 20, 1956 |

FOREIGN PATENTS

| | | |
|---|---|---|
| 409,756 | Great Britain | May 7, 1934 |
| 480,486 | Great Britain | July 22, 1938 |

OTHER REFERENCES

"Troubleshooting the Turret Tuner," by Lowe, Radio and Television News, January 1954, pp. 54, 55, 56.